UNITED STATES PATENT OFFICE.

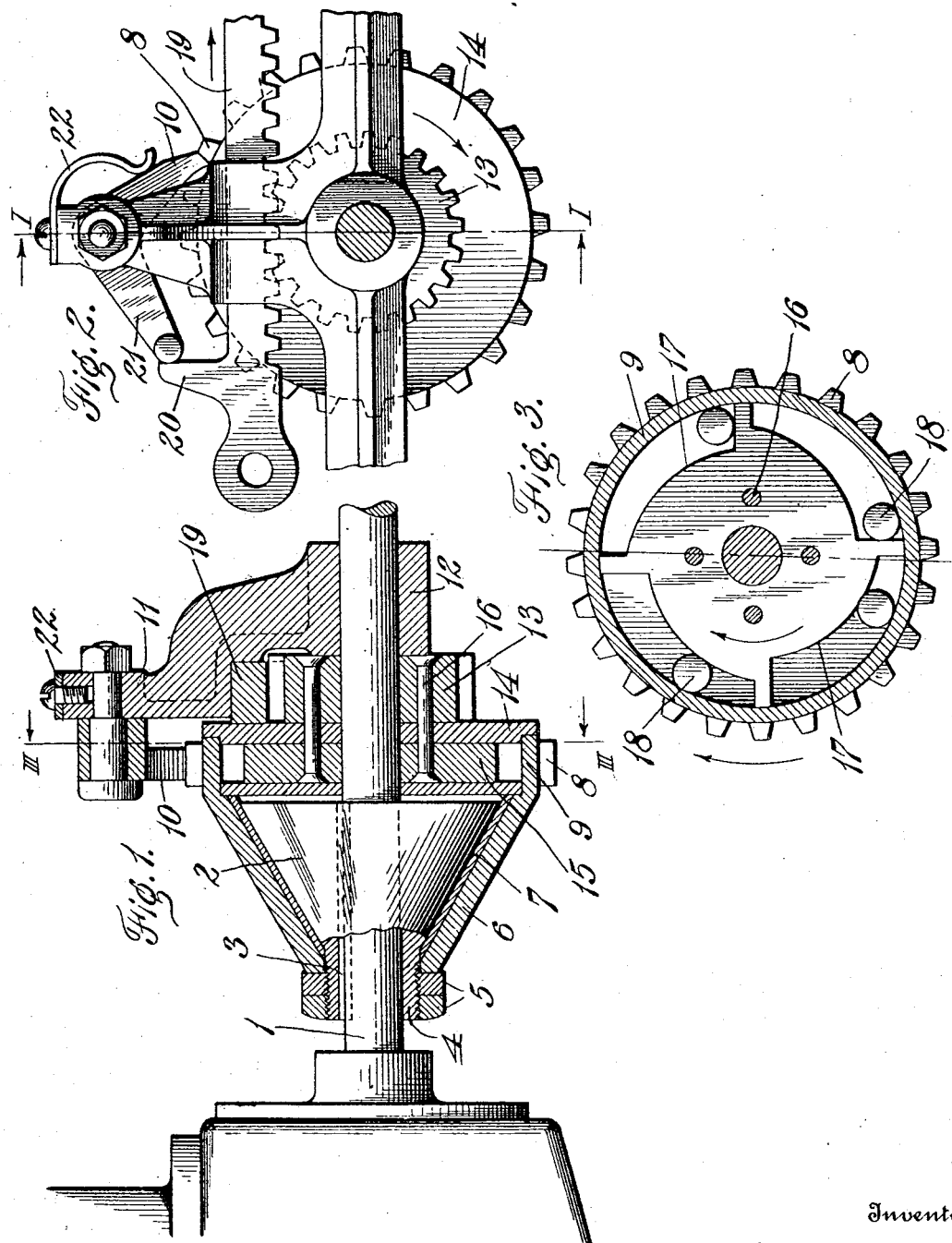

FRANK BRIGGS, OF CARO, MICHIGAN, ASSIGNOR OF ONE-HALF TO CLYDE E. KENYON, OF SPOKANE, WASHINGTON.

ENGINE-STARTER.

1,039,357.    Specification of Letters Patent.    Patented Sept. 24, 1912.

Application filed October 28, 1911. Serial No. 657,206.

*To all whom it may concern:*

Be it known that I, FRANK BRIGGS, a citizen of the United States of America, residing at Caro, in the county of Tuscola and State of Michigan, have invented certain new and useful Improvements in Engine-Starters, of which the following is a specification, reference being had therein to the accompanying drawings.

In "cranking" or starting explosive engines in automobiles or boats, the so-called back kick of the engine where the explosion takes place before the crank affected has gone over the center often results in serious injury to the operator and also frequently damages the mechanism itself.

This invention relates to a starter for automobiles or the like which may be manipulated from the operator's seat or station and which is so disposed that there can be no injury to the operator from the backward movement of the engine under premature explosion.

The invention consists in the matters hereinafter set forth and more particularly pointed out in the appended claims.

In the drawings, Figure 1 is a view, partially in section and partially in side elevation, of a starting device that embodies features of the invention; Fig. 2 is a view in elevation of the front end of a device with a section line 1—1 showing the plane of the drawing of Fig. 1; and Fig. 3 is a view in section taken on line 111—111 of Fig. 1.

Referring to the drawings a driving shaft 1 is adapted to be directly coupled as herein indicated or otherwise connected with the main shaft of a motor to which the device is applied. A friction cone 2 is non-rotatably secured as by a key 3 or the like to the shaft with a sleeve or hub 4 screwthreaded to receive jam nuts 5. The latter force an outer friction casing 6 against the cone 2, a lining 7 of fiber or other suitable material being interposed or being secured to one or the other of the meeting faces of the cone and casing. Ratchet teeth 8 are formed on or secured to a flange 9 on the larger end of the casing 6 and may be engaged by a dog 10 pivotally mounted on a lug 11 extending from a bearing bracket 12 embracing the shaft 1, or from other suitable stationary support.

A pinion 13 is journaled on the shaft 1 adjacent the angular flange 9 with a disk 14 acting as an end thrust bearing against the latter flange and a roller cam wheel 15 within the flange. The latter together with the disk 14 may be secured to the pinion 13 to move therewith as by cross pins 16 or the like or it may be made integral therewith. The roller cam wheel 15 has a plurality of peripheral faces 17 eccentric to the proximate inner peripheral face of the flange 9 so that when moved in one direction cam rollers 18 interposed between the flange and the faces 17 wedge between them and carry the flange and consequently the casing 2 with the pinion.

A rack 19 longitudinally reciprocable in the bracket 11 or other suitable guide way meshes with the pinion 13 and may be operatively connected to a lever or other means to rotate the casing through the clutch mechanism described. As shown in Fig. 2 the rack is near its initial position and when moved to its extreme limit of motion in the direction indicated by the arrow, a stop 20 thereon engages a bell crank or arm 21 on the dog 10 and lifts the latter out of engagement with the ratchet teeth 8 against the influence of a spring finger 22 so that when the rack is in initial or throw out position it is entirely disengaged from the clutch mechanism. As a result of this construction reciprocation of the rack turns the shaft that operates the machine through the frictional engagement of the cone and casing with the detent or dog dropping into engagement and locking the parts against retrograde movement. If, however, premature explosion takes place before the engine crank has passed the center the resultant forcible backward movement of the engine and its drive shaft causes the sleeve and cone to slip on each other so that the operator is not affected in any way and cannot be injured.

Obviously, changes in the details of construction may be made without departing from the spirit of the invention and I do not care to limit myself to any particular form or arrangement of parts.

What I claim is:—

1. A starting device for explosive engines comprising a driving shaft, a friction cone thereon, a casing in rotatable, frictional engagement with the cone, having an inner peripheral face concentric with the shaft, a driving member on the shaft within the face having outer curvilinear faces correspondingly eccentric to the inner face of the casing, rolling members between the concentric face of the casing and adjacent eccentric faces of the member each having a diameter greater than the shortest distance between the concentric and eccentric faces between which the member lies, means for oscillating the member on the shaft and means for locking the casing when the latter is freed from engagement with the rolling members by the movement of the driving member.

2. A starting device for explosive engines comprising a driving shaft, a friction cone secured thereon, a casing in adjustable frictional engagement with the cone, an annular flange at one end of the casing, a cam roller wheel journaled on the shaft within the flange and provided with cam faces eccentric to the flange, cam rollers adapted to wedge between the eccentric faces and the flange when the roller wheel is moved in one direction, a dog adapted to positively lock the casing from turning in the other direction, and reciprocable means for turning the roller wheel adapted when in initial position to hold the dog disengaged.

3. A starting device for explosive engines comprising a driving shaft, a friction cone secured thereon, a casing in adjustable frictional engagement with the cone provided with an annular flange, ratchet teeth on the flange, a cam roller wheel journaled on the shaft within the flange provided with cam faces eccentric to the flange, cam rollers adapted to wedge between the cam faces and the flange when the roller wheel is turned in one direction, a dog adapted to engage the flange teeth and lock the casing from turning in the other direction, a pinion journaled on the shaft for rotating the cam roller wheel, and a reciprocable rack in mesh with the pinion adapted when moved into initial position to trip the dog and hold the same disengaged.

4. A starting device for explosive engines comprising a driving shaft, a friction cone secured thereon having a screwthreaded hub, a casing in frictional engagement with the cone, jam nuts in screwthreaded engagement with the cone hub for forcing the casing against the cone, an annular flange on the casing, a cam roller wheel journaled on the shaft and provided with peripheral cam faces eccentric to the flange, cam rollers adapted to wedge between the cam faces and the flange when the cam roller wheel is turned in one direction, ratchet teeth on the flange, a dog engaging the teeth for locking the casing against movement in the other direction, a pinion rotatable on the shaft secured to the cam roller wheel, and a reciprocable rack in mesh with the pinion adapted to trip the dog when moved into initial position and to hold the same disengaged.

In testimony whereof I affix my signature in presence of two witnesses.

FRANK BRIGGS.

Witnesses:
ANNA M. DORR,
C. R. STICKNEY.

---

Copies of this patent may be obtained for five cents each, by addressing the "Commissioner of Patents, Washington, D. C."